J. L. CREVELING.
ELECTRIC REGULATION.
ORIGINAL FILED MAR. 7, 1917.
1,442,050.
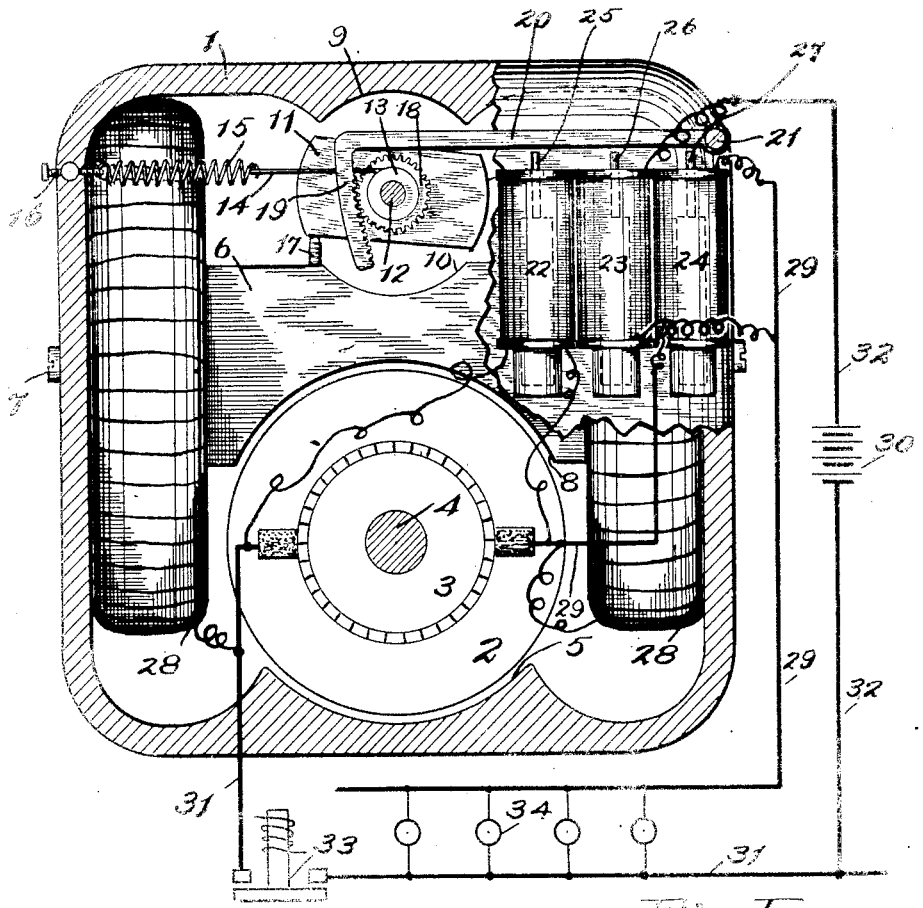
Fig. I.
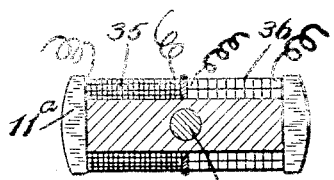
Fig. II.
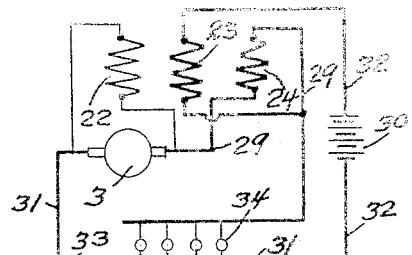
Fig. III.
INVENTOR.
John L. Creveling Patented Jan. 16, 1923.

1,442,050

UNITED STATES PATENT OFFICE.

JOHN L. CREVELING, OF WHITE PLAINS, NEW YORK, ASSIGNOR TO GOULD COUPLER COMPANY, A CORPORATION OF NEW YORK.

ELECTRIC REGULATION.

Application filed March 7, 1917, Serial No. 153,134. Renewed November 25, 1922.

*To all whom it may concern:*

Be it known that I, JOHN L. CREVELING, a citizen of the United States, residing at White Plains, in the county of Westchester and State of New York, have invented new and useful Improvements in Electric Regulations, set forth in the annexed specification and drawing, forming a part thereof.

My invention pertains to that class of electric regulation wherein it is desired to regulate a dynamo electric machine, and has for a particular object to provide means whereby the same may be automatically regulated.

A further object of my invention is to provide means whereby a dynamo will be automatically regulated with respect to a plurality of functions, as for example the voltage across some circuit or circuits supplied by a dynamo operating as a generator, and the current in some circuit or circuits supplied by a dynamo when thus acting.

A further object of my invention is to produce such means wherein the regulation in response to one function will not interfere with the regulation in response to another function when such regulation is in a direction desired. But, if the regulation in response to one function tend to interfere with a predetermined operation of the generator, so as to affect some other function to a predetermined limit, the regulation will be usurped or modified by means responsive to the last named function, and the dynamo will at all times be regulated in such manner as to carry out a predescribed method of operation when used under certain conditions contemplated in my invention, as for example in a system wherein a plurality of variables may each affect the dynamo in such manner that any one will so regulate the same as to prevent it exceeding a predetermined limit of said particular variable.

As my invention is particularly applicable to systems of electrical distribution wherein a dynamo driven at widely varying speeds is used to charge a storage battery and operate lamps or other translating devices in conjunction therewith, and wherein it is desired to automatically regulate the dynamo so as to properly charge the storage battery and maintain the translating devices, it will be described with particular reference to such a system, for the purpose of illustration.

In the drawing, Fig. I is a diagrammatic representation of such a system embodying my invention; and Fig. II shows a modification which may be made in the system of Fig. I.

Fig. III is a diagram of the wiring of the system shown in Fig. I.

In Fig. I there is shown a dynamo serving as a generator, provided with a shell or frame 1, an armature 2 having a suitable commutator 3 and carried by the shaft 4 in any suitable type of bearing members not shown. A portion of the shell 1 is so shaped as to form a pole piece 5 in operative relation to the armature 2, while a member 6, fitted tightly into the frame 1 and secured therein as by screws 7, is so shaped as to form a pole piece 8 in operative relation to the armature 2. The upper portion of the frame 1 is so shaped as to provide a pole piece 9, while a portion of the member 6 is so shaped as to form a corresponding pole piece 10 between which may be revolved a shunting member 11 of iron or other magnetic material supported as by the shaft 12 in suitable bearings not shown. Upon the shaft 12 there is mounted a sheave or drum 13 engaging the band 14 attached to the spring 15 which is adjustable as by the screw 16, the arrangement being such that the spring 15 tends to rotate the member 11 in a counter-clockwise direction, while its movement in such direction is limited by the screw or stop 17, preferably of brass or other non-magnetic material. The shaft 12 also carries a pinion 18 which engages the segmental rack 19 carried by the lever 20 pivotally supported from the frame as indicated at 21. Upon the frame are mounted three solenoids 22, 23 and 24, each provided with a suitable core, indicated in dotted lines, operatively arranged with suitable dashpot mechanism at one extremity, as indicated, and at the other extremity with guide rods of non-magnetic material 25, 26 and 27, respectively, each solenoid and its respective core and other cooperating parts being so arranged that when energized it tends to lift its respective core and guide rod so as to bring the guide rod into contact with the lever 20, whereupon further motion will affect the lever 20 and tend by lifting the said lever to rotate the member 11 in a clockwise direction through the instrumentality of rack 19 and pinion 18 against the tension of spring 15, while too sudden movement of the cores will be restrained by their respective dashpots. The magnetic field is maintained by means of suitable coils 28, in this instance indicated as shunt coils, directly across the brushes. Solenoid 22 is composed of a fine voltage winding in shunt across the generator. Coil 24 is of coarse wire and in series with the positive generator lead 29, while solenoid 23 is of coarse wire and is in series with the circuit containing the storage battery 30, which circuit is across the generator leads 29 and 31 as by wires 32. The negative generator lead 31 contains the automatic switch 33, and lamps or other translating devices 34 are shown in shunt to the generator and battery circuits.

The connections of the coils of Fig. I are plainly shown in the diagram of Fig. III.

Swith 33 is preferably one of the automatic variety adapted to close its circuit when the generator voltage is substantially equal or slightly in excess of that of the battery and to open its circuit when the generator voltage is substantially equal or very slightly below that of the battery, in such manner as to prevent back discharge. And as such switches are well known in the art and the particular type chosen forms no part of my present invention, the mere presence of such a switch is indicated, and details of construction are purposely omitted for the sake of clearness, it being understood that any suitable type of such switch may be used.

In Fig. II the member 11ª is shown partially in section and provided with a fine voltage winding 35 and a coarse current winding 36, for a purpose which will hereinafter appear.

An operation of my invention, referring particularly to Fig. I and Fig. III, is as follows:

If the generator be at rest or running at low speed, the switch 33 will be open and the parts of the system will be in the position shown in the drawing, and the lamps or translating devices 34 may be supplied by the battery 30 in the usual manner. If the generator speed be brought to that point at which its voltage is slightly in excess of that of the battery, switch 33 will be automatically closed and current will flow from the generator through lead 29, solenoid 24 to the translating devices, and through solenoid 23 and storage battery 30 through leads 32, return from the battery and translating devices 34 both being through lead 31 and switch 33. The tendency of magnetic lines to leak from pole piece 10 to pole piece 9 through the member 11 will tend to rotate the said member in a clockwise direction so as to increase the number of lines passing therethrough and thus weaken the useful flux through the armature. And I so adjust the spring 15 as by means of the screw 16 that when the generator is substantially at or below the desired voltage across the generator, the member 11 will be held against the stop 17, in the position shown in the drawing, wherein it will shunt away from the armature the least amount of the useful magnetic flux. And it will be obvious that if the generator voltage increase slightly, the magnetic lines set up by the coils 28 will increase, and their tendency to rotate the member 11 into such position as to shunt away a greater portion of the armature flux will also increase, and the member 11 will therefore have a tendency toward rotating into such position as to automatically hold the generator voltage constant after reaching a predetermined value determined by the spring 15, and might alone provide a more or less coarse type of voltage regulation for the generator. However, my invention comprehends a more delicately responsive regulation, and I therefore adjust the spring 15 so that when the maximum desired voltage is across the generator circuit, the torque, as above described, upon the member 11 is almost sufficient to revolve the same into regulating position. And I so adjust the core and solenoid 22, in any desired manner, that an extremely small increase above this predetermined desired voltage will cause the solenoid to raise its core and bring the member 25 into operative contact with the member 20 and raise the same and rotate the member 11 in a clockwise direction. And, by shunting away more of the useful flux, will counter-act any appreciable increase in voltage across the circuit bridged by the solenoid 22. If the generator voltage tend to fall, a reverse operation will take place tending to restore the same to the normal. And it will be obvious that in this manner I cause the regulating mechanism to respond to very delicate fluctuations, and may thereby hold the voltage of the generator substantially constant throughout wide speed changes above a predetermined limit.

In practice, I ordinarily choose the voltage to be held constant by the solenoid 22 as the maximum value necessary to give the battery 30 a full charge. Therefore, as the battery 30 becomes charged and its voltage approaches this value, the current therethrough will naturally taper off and approach zero in a desirable manner. If at any time the total generator current tend to increase beyond a predetermined value for which solenoid 24 and its cooperating parts are adjusted, the said solenoid will raise its core and, through the instrumentality of rod 27, so manipulate the lever 20 as to rotate the member 11 into such position that the same will shunt away sufficient of the field flux to prevent the generator from exceeding this predetermined total output. If that portion of the generator current supplied to the battery tend to increase beyond the desired charging current for which solenoid 23 and its cooperating parts are adjusted, the said solenoid will raise its core and, through the instrumentality of rod 26, so affect the lever 20 as to rotate member 11 into such position as to prevent this desired maximum charging current from being exceeded throughout wide speed changes of the generator. And it will be noted that if at any time one of the responsive means be regulating the generator and the maximum value of the quantity regulated by another means tends to be exceeded, the said last named means will come into action and usurp the function of regulation of the generator, and, by lowering the value of the quantity upon which the operation of the remaining means is dependent, cause the same to go out of action until a value of one of their respective responsive qualities be reached which will cause it to usurp the function of regulating the generator, and in a similar manner practically put the other means out of action.

The member 11 in Fig. I may be of any desired section and is illustrated merely as a magnetic body preferably of iron or mild steel having low magnetic reluctance; while in Fig. II the member 11ª is shown as provided with a shunt or voltage responsive polarizing coil 35 which may be used to cause the member 11ª to have a greater torque, and therefore delicately responsive to voltage fluctuations, whereby it may be made to respond more accurately in step with the voltage responsive means governed by the coil 22, which is desirable under some circumstances. The member 11ª in Fig. II is also shown as provided with a series winding 36 which may be in series with the main circuit, the same as solenoid 24 of Fig. I, or in series with any other circuit, as for example the battery circuit, as is solenoid 23 of Fig. I.

It will be obvious that either a plain voltage winding, as shown at 35, or a plain current winding, as shown at 36, may be used alone, if desirable, or both may be employed, if so chosen. Further, it will be plain that the polarizing winding or windings may either be wound upon the member 11 in a manner similar to the old type of shuttle armature, or arranged in any suitable manner.

And it will be noted that through the instrumentality of a very simple arrangement I have provided means whereby a generator may be driven at variable speeds and have attached thereto, so as to substantially form a portion thereof, a simple and rugged regulating means capable of holding with considerable delicacy the voltage across the generator within predetermined limits, and also the current output of the generator within predescribed limits, as well as limiting the possible charging current to a storage battery, when used in conjunction therewith, and that such an arrangement provides an automatically regulated battery charging generator adapted to properly maintain lamps or other translating devices and keep a battery properly charged provided it merely be driven for sufficient length of time, at or above a predetermined critical speed, the excess above which will have little or no effect upon the system external to the generator. Not only that, but, from a practical standpoint, an important feature may be said to reside in the fact that the entire process of regulation of the generator may be readily watched so that one with only fair skill in the art may almost at a glance tell what parts of the apparatus are responding properly or need adjustment or repair.

Further, it will be obvious that while I have described the operation of my invention with respect to a dynamo serving as a generator, it is not limited to such use, but refers to the regulation of a dynamo electric machine when operating either as a generator or motor.

I do not wish in any way to limit myself to any of the exact constructions or details of operation given above to illustrate an embodiment of my invention, for it will be obvious that wide departure may be made therein without departing from the spirit and scope thereof.

What I claim is:

1. In a dynamo electric machine, regulating means comprehending a movable magnetic shunt and means independently affected by a plurality of electrical functions of said machine for mechanically affecting said shunt to regulate the dynamo.

2. In a dynamo electric machine, an armature and field exciting means, means for shunting a portion of the magnetic field away from the armature electromagnetic means responsive to a plurality of electrical functions dependent upon the operation of said dynamo, and means whereby the operation of said responsive means affects the operation of the shunting means, independently in response to each of the electrical functions.

3. A dynamo comprehending an armature, a magnetic circuit and means for maintaining a magnetic flux therethrough, combined with movable means for diverting a portion of said flux away from the armature, voltage responsive means, current responsive means, and means whereby the responsive means each affect the diverting means to regulate the dynamo.

4. A dynamo comprehending an armature, a magnetic circuit and means for maintaining a magnetic flux therethrough, combined with movable means for diverting a portion of said flux away from the armature, voltage responsive means, current responsive means, and means whereby the responsive means each independently affect the diverting means to regulate the dynamo.

5. A dynamo comprehending an armature, a magnetic circuit and means for maintaining a magnetic flux therethrough, combined with movable means for diverting a portion of said flux away from the armature, voltage responsive means, current responsive means, and means whereby the responsive means affect the diverting means comprehending a member independently affected by each of the responsive means.

6. A dynamo comprehending an armature, a magnetic circuit and means for maintaining a magnetic flux therethrough, combined with movable means for diverting a portion of said flux away from the armature, voltage responsive means, current responsive means, and means whereby the responsive means affect the diverting means comprehending a movable member to which motion is independently imparted by each of the responsive means.

7. In a dynamo, the combination with field exciting means, an armature, a magnetic circuit cooperating with said field exciting means to direct lines of force through said armature, and a movable member of magnetic material for shunting magnetic lines away from the armature and affected by the field exciting means, of means responsive to a plurality of functions of operation of the dynamo and cooperating mechanically to assist the field exciting means in affecting the position of the movable member.

8. In a dynamo, the combination with field exciting means, an armature, a magnetic circuit cooperating with said field exciting means to direct lines of force through said armature, and a movable member of magnetic material for shunting magnetic lines away from the armature and affected by the field exciting means, of means responsive to a plurality of functions of operation of the dynamo and cooperating mechanically to assist the field exciting means in affecting the position of the movable member to cause the same to regulate the dynamo independently with respect to a plurality of operating functions thereof.

9. In a dynamo, field exciting means, an armature, and a circuit of low magnetic reluctance cooperating with the field exciting means to direct magnetic lines through said armature, a movable magnetic shunt adapted to shunt magnetic lines away from said armature in variable degree depending upon the position thereof, means for determining the position thereof, and a plurality of independently movable members responsive to a plurality of functions of the dynamo cooperating therewith to regulate the dynamo.

10. In a dynamo, field exciting means, an armature, and a circuit of low magnetic reluctance cooperating with the field exciting means to direct magnetic lines through said armature, a movable magnetic shunt adapted to control the dynamo by shunting magnetic lines away from the armature and tending upon increase of field strength of the dynamo to shunt away a greater portion of said lines, and a plurality of means responsive to functions of operation of the dynamo adapted to independently cooperate to mechanically assist the field exciting means in affecting the position of the shunting means.

11. The combination with a dynamo, a storage battery and translating devices supplied thereby, of means for regulating the dynamo comprehending a magnetic shunt member the effect of which is varied by motion imparted thereto, and independent means for affecting the same responsive to current fluctuations and to voltage fluctuations in a circuit affected by the battery and the translating devices.

12. The combination with a dynamo, a storage battery and translating devices supplied thereby, of means for regulating the dynamo comprehending a magnetic shunt member the effect of which is varied by motion imparted thereto, and affecting means independently responsive to voltage fluctuations and to current fluctuations in a circuit affected by the translating devices and the conditon of the battery.

13. The combination with a dynamo, a storage battery and translating devices supplied thereby, of means for regulating the dynamo comprehending a magnetic shunt member the effect of which is varied by motion imparted thereto, and affecting means independently responsive to voltage fluctuations, fluctuations in current supplied to the battery, and fluctuations in the total current output of the dynamo.

14. Means for regulating a dynamo having a field flux comprehending a means for varying the path of said flux and a plurality of responsive means affected by the operation of the dynamo independently affecting said varying means.

15. The combination with a dynamo having a field flux and means cooperating therewith and tending to vary the path of said flux and thereby regulate the dynamo in response to electrical fluctuations caused by speed variations, of independent means responsive to electrical fluctuations depending upon the operation of the dynamo cooperating with said flux varying means to affect the operation thereof and cause the same to operate and regulate the dynamo upon smaller fluctuations than it is capable of operating upon alone.

16. In a dynamo, field exciting means, an armature and a circuit of low magnetic reluctance cooperating with the field exciting means to direct magnetic lines through said armature, a movable magnetic shunt adapted to control the dynamo by shunting magnetic lines away from the armature and tending upon increase of field strength of the dynamo to shunt away a greater portion of said lines, means responsive to electrical fluctuations for magnetically affecting the co-action between the shunt member and the magnetic field, and independent means responsive to electrical fluctuations for mechanically affecting said shunt member.

17. In a dynamo, field exciting means, an armature and a circuit of low magnetic reluctance cooperating with the field exciting means to direct magnetic lines through said armature, a movable magnetic shunt adapted to control the dynamo by shunting magnetic lines away from the armature and tending upon increase of field strength of the dynamo to shunt away a greater portion of said lines, means responsive to electrical fluctuations for magnetically affecting the co-action between the shunt member and the magnetic field, and a plurality of independent means responsive to electrical fluctuations for mechanically affecting said shunt member.

18. In a dynamo, field exciting means, an armature and a circuit of low magnetic reluctance cooperating with the field exciting means to direct magnetic lines through said armature, a movable magnetic shunt adapted to control the dynamo by shunting magnetic lines away from the armature and tending upon increase of field strength of the dynamo to shunt away a greater portion of said lines, means responsive to electrical fluctuations for magnetically affecting the co-action between the shunt member and the magnetic field, and a plurality of means independently affecting said shunt member.

19. In a dynamo, field exciting means, an armature and a circuit of low magnetic reluctance cooperating with the field exciting means to direct magnetic lines through said armature, a movable magnetic shunt adapted to control the dynamo by shunting magnetic lines away from the armature and tending upon increase of field strength of the dynamo to shunt away a greater portion of said lines, means responsive to electrical fluctuations for magnetically affecting the co-action between the shunt member and the magnetic field, and means responsive to voltage and current fluctuations affecting said shunt member.

20. In a dynamo, field exciting means, an armature and a circuit of low magnetic reluctance coperating with the field exciting means to direct magnetic lines through said armature, a movable magnetic shunt adapted to control the dynamo by shunting magnetic lines away from the armature and tending upon increase of field strength of the dynamo to shunt away a greater portion of said lines, means responsive to electrical fluctuations for magnetically affecting the co-action between the shunt member and the magnetic field, and means responsive to current fluctuations affecting said shunt member.

21. In a dynamo, field exciting means, an armature and a circuit of low magnetic reluctance cooperating with the field exciting means to direct magnetic lines through said armature, a movable magnetic shunt adapted to control the dynamo by shunting magnetic lines away from the armature and tending upon increase of field strength of the dynamo to shunt away a greater portion of said lines, means responsive to electrical fluctuations for magnetically affecting the co-action between the shunt member and the magnetic field, and means responsive to voltage fluctuations affecting said shunt member.

22. In a dynamo, field exciting means, an armature and a circuit of low magnetic reluctance co-operating with the field exciting means to direct magnetic lines through said armature, a movable magnetic shunt adapted to control the dynamo by shunting magnetic lines away from the armature and tending upon increase of field strength of the dynamo to shunt away a greater portion of said lines, means responsive to electrical fluctuations for magnetically affecting the co-action between the shunt member and the magnetic field, and means responsive to current fluctuations and means responsive to voltage fluctuations affecting said shunt member.

JOHN L. CREVELING.